United States Patent
Grenier et al.

(10) Patent No.: US 6,654,923 B1
(45) Date of Patent: Nov. 25, 2003

(54) ATM GROUP PROTECTION SWITCHING METHOD AND APPARATUS

(75) Inventors: Guy L. Grenier, Ottawa (CA); Bruce D. Keats, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/392,455

(22) Filed: Sep. 9, 1999

(51) Int. Cl.$^7$ ............................................. G06F 11/10
(52) U.S. Cl. ...................... 714/752; 714/43; 370/216
(58) Field of Search ...................... 714/752, 43, 4; 370/241, 241.1, 242, 248, 218, 250, 216, 229, 237

(56) References Cited

U.S. PATENT DOCUMENTS

| | | | | |
|---|---|---|---|---|
| 5,757,793 A | * | 5/1998 | Read et al. | 370/358 |
| 5,764,651 A | * | 6/1998 | Bullock et al. | 714/704 |
| 5,793,745 A | | 8/1998 | Manchester | 370/224 |
| 5,838,924 A | | 11/1998 | Anderson et al. | 385/200.69 |
| 6,014,767 A | * | 1/2000 | Glaise | 714/776 |
| 6,205,562 B1 | * | 3/2001 | Fukushima et al. | 714/43 |
| 6,442,131 B1 | * | 8/2002 | Kondo | 370/218 |
| 6,498,792 B1 | * | 12/2002 | Johnson et al. | 370/388 |

FOREIGN PATENT DOCUMENTS

EP 0824292 A 2/1998

OTHER PUBLICATIONS

International Telecommunication Union, "ATM Protection Switching", ITU–T Recommendation I.630.
International Telecommunication Union, "B–ISDN Operation and Maintenance Principles and Functions" ITU–T Recommendation I.610.
J. Anderson et al., "Virtual path group protection switching –A method for fast ATM network survivability," *Bell Labs Technical Journal*, Wiley, CA, vol. 2, No. 2, Mar. 1997, pp. 213–232.
P. Veitch et al., "ATM Network Resilience" *IEEE Network*, IEEE Inc. New York, US, vol. 11, No. 5, Sep. 1997, pp. 26–33.
R. Kawamura et al., "Architectures for ATM Network Survivability and Their Field Deployment" IEEE Communications Magazine, Piscataway, New Jersey, US, vol. 37, No. 8, Aug. 1999, pp. 88–94.
European Search Report Application No. 307793, transmitted Mar. 17, 2003.

* cited by examiner

*Primary Examiner*—Phung M. Chung

(57) ABSTRACT

A method of switching between groups of working and protection channels/paths in the presence of signal degrade in an ATM network is disclosed. Signal degrade is monitored on a subset of virtual paths ("VP"s) within a VP group or within a subset of virtual channels within a VC group. If signal degrade is detected on this subset of VPs or VCs, all VPs or VCs within the VPG or VCG are switched from a working entity to a protection entity. Network elements and software embodying such a method are also disclosed.

20 Claims, 4 Drawing Sheets

1+1 VCG PROTECTION SWITCHING

1:1 VCG PROTECTION SWITCHING

ATM GROUP PROTECTION SWITCHING METHOD AND APPARATUS

FIELD OF THE INVENTION

The present invention relates to asynchronous transfer mode ("ATM") networks, and more particularly to a method and apparatus for detecting and reacting to defects on such a network.

BACKGROUND OF THE INVENTION

Many modern communications networks are adapted to detect and react to defects that may impair the transmission of data along such networks. Synchronous Optical networks ("SONET"), for example, detect network defects and switch the routing of traffic within the network a long differing physical paths in the presence of a defect, to ensure data traffic delivery between end points. Such switching is typically referred to as "protection switching".

Modern ATM networks, as for example detailed in International Telecommunication Union Recommendations ITU-T I.326, I.361, I.610, I.630, and I.732, the contents of all of which are hereby incorporated by reference, support similar protection switching in the presence of defects to provide a signal across the network in the presence of signal failure (signal fail—"SF"), or in the presence of a degraded signal (signal degrade—"SD").

As detailed in ITU-T Recommendation I.630, ATM protection switching may be effected for single virtual channels ("VC"s); virtual paths ("VP"s); and logical groups of VPs or VCs ("VPG"s or "VCG"s).

SF on an ATM network is often manifested in loss of frames (LOF); loss of signal (LOS); or loss of cell delineation (LCD) at the physical layer carrying ATM traffic. As such ITU-T Recommendation I.630, suggests that a SF may be detected at the physical layer. SD, on the other hand, typically manifests itself in the presence of bit errors within the ATM signal. As such, ITU-T Recommendation I.630 suggests detecting SD within VCs at the ATM layer, by using performance monitoring ("PM") cells. That is, PM cells that may be used to assess the presence of signal degrade are inserted into an ATM stream. Using these inserted PM cells, the quality of user cells may be assessed at a downstream node.

ITU-T Recommendation I.630, however, does not address a mechanism for effecting protection switching for VPs, VPGs or VCGs in the presence of SD. Unfortunately, the use of PM flows for all VCs within a VP, VPG or VCG would require undue network resources, in order to monitor such flows on all VPs within a VPG or all VCs within a VCG.

Accordingly, a method and apparatus that facilitates ATM layer protection switching for VPGs or VCGs in the presence of SD is desirable.

SUMMARY OF THE INVENTION

Therefore, in accordance with the present invention, SD is monitored on a subset of VPs within a VPG or within a subset of VCs within a VCG. If SD is detected on this subset of VPs or VCs, all VPs or VCs within the VPG or VCG are switched from a working entity to a protection entity.

In accordance with the present invention, receipt of traffic is switched from a group of working ATM channels/paths to a group of protection ATM channels/paths on a network element in an ATM network. Specifically, ATM monitoring cells are received on a subset of ATM channels/paths of the group of working ATM channels/paths. Each of the ATM monitoring cells includes an error detection code for a plurality of ATM cells received at the network element within an associated ATM channel/path. In response to the error detection codes indicating a degraded signal within an associated ATM channel/path, the network element receives the traffic from all channels within the group of protection ATM channels/paths in favour of receiving the traffic on the group of working ATM channels/paths.

Advantageously then, as SD need only be monitored on a subset of VCs or VPs within a VCG or VPG, network resources are conserved.

Network elements and software may embody these methods.

Other aspects and features of the present invention will become apparent to those of ordinary skill in the art, upon review of the following description of specific embodiments of the invention in conjunction with the accompanying figures.

BRIEF DESCRIPTION OF THE DRAWINGS

In figures which illustrate, by way of example only, preferred embodiments of the invention.

DETAILED DESCRIPTION

Figure 1:
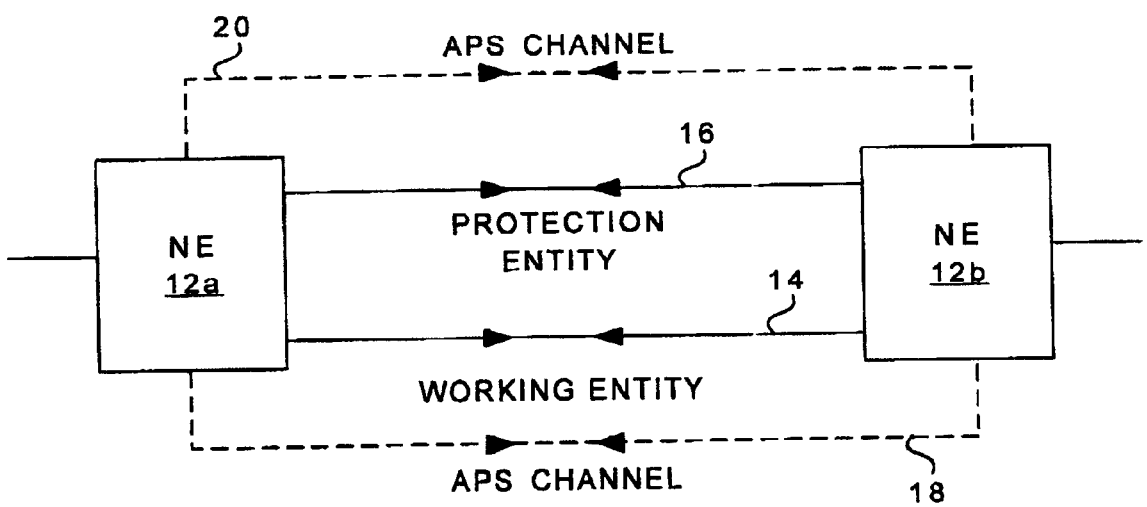
FIG. 1 is a simplified block diagram of two network elements ("NE"s) within an ATM network, exemplary of the resent invention.

FIG. 1 illustrates ATM NEs 12a, 12b, (collectively, or individually 12) forming part of an ATM network, and exemplary of embodiments of the present invention. As will be appreciated, the ATM network will be foamed upon a physical network, adhering to a physical layer protocol. This physical network, may for example, be a Synchronous Optical Network ("SONET"), as it is called in North America, or its European counterpart, a Synchronous Digital Hierarchy (SDH). It may also be a DSn based telephony network.

NEs 12 may be conventional ATM switches. NEs 12 may be end nodes with which traffic originates on the ATM network, or intermediate nodes connected between end nodes. As illustrated, NEs 12 are communicatively coupled by at least two links (hereafter referred to as "entities") 14 and 16 capable of transporting payload traffic between NEs 12a and 12b. As will become apparent, third and fourth links 18 and 20, used to carry out-of band signaling messages may further connect NEs 12. Entities 14 and 16 and links 18, 20 may directly connect NEs 12a and 12b, or alternatively couple NEs 12a and 12b by way of intermediate NEs (not illustrated). For simplicity of illustration, entities 14 and 16 and links 18 and 20 are illustrated as bidirectional links. Each entity 14 or 16, and links 18 or 20 however, is intended to represent two unidirectional links, with one carrying traffic from NE 12a to NE 12b, an(i the other from NE 12b to NE 12a. As will be appreciated each unidirectional link may be logically and physically separate from another associated unidirectional link.

NEs 12 exchange communications traffic in accordance with known ATM protocols. Specifically, prior to the exchange of payload traffic one or more virtual circuits, for the exchange of payload data is negotiated between end NEs on the network. Each virtual circuit is made up of a series of virtual channels ("VC"s)carried on physical connections between adjacent nodes on the network. For illustration, each of entities 14, 16 is intended to represent an entity transporting logical groups of VCs, between nodes 12a and 12b. As will be appreciated, entities 14 and 16 could alternatively transport single VCs; virtual paths("VP"s); or groups of VPs between nodes 12a and 12b. Links 18 and 20 are intended to represent single channels (or a series of channels) between NEs 12a and 12b.

Preferably entities 14 and 16 are physically as well as logically separate. However, as will be appreciated, any two or more of entities 14, 16 and links 19, 20 may follow the same physical route between NEs 12.

Traffic is exchanged between NEs 12 in packets. Each packet has fifty-three bytes and is known as a "cell". Each cell includes a five byte header. The cell header includes a payload type identifier ("PTI"), a virtual channel identifier ("VCI") associated with the cell, and a virtual path identifier ("VPI"). The VPI identifies a path between two nodes, while a VCI identifies a channel along such a path. If NEs 12 are adjacent to each other, all traffic passing from NEs 12a to 12b associated with a particular virtual circuit is transported on a virtual channel ("VC") between NEs 12a and 12b. The VC may be uniquely identified by a VPI/VCI pair contained in cells transferred between NEs 12a and 12b. A routing table maintained at NE 12a, allows NEs 12a to switch all traffic arriving at the input of NE 12a in one VC to another VC associated wit)i a unique VPI/VCI pair at the output of NE 12a. Similarly, NE 12b switches cells associated with a VC at the input of NE 12b to a single VC associated with a unique VPI/VCI pair at the output of NE 12b. Thereby all cells associated with a virtual circuit are routed along a defined route along the network. A virtual circuit between end-nodes on an ATM network is thus identified by a series of VPI/VCI pairs, across the network.

In addition to negotiating a primary traffic carrying channel between NEs 12a and 12b, a secondary channel may also be negotiated between NEs 12a and 12b. A primary channel is typically referred to as a working channel. As will be appreciated, secondary channels may be negotiated for a virtual circuit across the network, )r for a portion of a virtual circuit across the network. A secondary channel is often referred to as a protection channel carried on a protection entity, and may be used to carry traffic normally transported by a working channel, in the event of a defect.

ITU-T Recommendation I.630 details ATM layer protection switching, from a working channel to a projection channel, performed in response to the detection of certain defects. Such protection switching at the ATM layer should avoid contentions between any protection switching available at the physical layer of the network. Preferably, then, when SONET is used as a physical layer for an ATM network, SONET protection switching is disabled in order to avoid such contention.

As will be appreciated, by those of ordinary skill in the art, current ATM protocols contemplate 1:1 protection switching; 1+1 protection switching or m:n protection switching. That is, identical traffic may be carried along two entities as in 1+1 protection switching; alternatively traffic may be carried along one entity, with a second entity allocated to potentially carry traffic in the event of a defect, as in 1:1 protection switching; or traffic may be carried along m entities with n further entities allocated for protection switching. Moreover, this protection switching may be implemented by way of linear network element connections, as illustrated, in FIG. 1, or alternatively by way of ring or mesh connections between nodes (not illustrated).

A portion of an ATM network for which protection switching is supported is referred to as a protected domain within the ATM network. Protection switching may be supported for a single VC (ie. a single VPI/VCI pair) between two nodes ("VC protection switching"); or for all VCs within a virtual path ("VP protection switching").

Alternatively, and as illustrated in FIG. 1, multiple VPs or VCs may be protected as virtual path or virtual channel groups ("VPG"s or "VCG"s). That is, for the purposes of protection switching, NEs 12a and 12b are configured to group VCs in VCGs, in manners understood by those of ordinary skill in the art. A relationship identifying VCs within a VCG is maintained within the memory of each NE 12a and 12b. An example configuration of NEs configured for VCG or VPG protection switching is detailed in U.S. Pat. No. 5,838,924, the contents of which are hereby incorporated by reference.

As will be appreciated, protection switching for VPGs and VCGs is established for an entire VCG or VPG, based on data associating various VCs within a VCG or VPs within a VPG, and stored at each NE. That is, in the event a defect is detected on any working VC or VP within the group at an NE, traffic carried by the entire VCG or VPG may be switched to the established protection entity for the VPG or VCG by an NE 12a or 12b. In the illustrated embodiment of FIG. 1, entity 16 transports a logical group of projection channels for a logical group of working channels on entity 14.

In addition to exchanging payload carrying ("user") cells, NEs 12a and 12b further exchange operations and management ("OAM") cells dedicated to the management of nodes 12 the associated ATM network. Currently, the format of OAM cells is defined in ITU Recommendations ITU-T I.610 and I.630. OAM cells are identified by the values of the PTI or VCI fields of the cell header.

As specified in ITU-T I.610 OAM cells specific to a VC may be identified by a PTI field value (binary) of 100 (4) or 101 (5). Sequential VC specific OAM cells passed within a VP or VC are referred to as F4 or F5 flows. F4 and F5 flows are carried in band for a specific channel and are identified by the VC's VPI/VCI pair contained in the OAM cell header. Alternatively, OAM cells specific to an entire VP are identified by VCI value of 3 or 4. VP specific OAM cells are carried in band for a specific VP identified by its VPI contained in the OAM cell header.

Protection switching, (ie. the switching of traffic from a working ATM entity to a protection entity) is accomplished through the exchange of OAM cells, generated in response to certain sensed conditions. Such OAM cells may be transported in-band along each affected VP or VC, and are identified by VPI/VCI, pairs identical to the protected VC.

Alternatively, a dedicated out-of-band OAM channel used for protection switching may be provisioned and associated with a VPG or VCG. This dedicated OAM channel acts as a signaling channel and is referred to as an ()AM ATM Protection Switching ("APS") channel, and is identified between NEs by its own unique VPI/VCI pair. In the embodiment of FIG. 1, links 18 and 20 may each carry an APS channel. Link 18 carries an APS channel associated with the group of logical channels associated with entity 14;

link 20 carries and APS channel associated with the group of logical channels associated with entity 16.

OAM cells may be generated and inserted into a stream of ATM cells by any element of the ATM network, including NEs 12. As detailed in I.610, in the event certain failures are detected at the SONET layer, as manifested by LOS, LOF, or LCD, the NEs affected by the fault may exchange OAM cells, known as Virtual Path—Alarm Indication Signal ("VP-AIS") cells or Virtual Circuit—Alarm Indication Signal ("VC-AIS") cells and Remote Defect Indicator ("RDI") cells. OAM AIS cells are generated and-sent downstream within an affected VP or VC at fixed intervals by a source NE, indicating a defect in the channel or entity. In the embodiment of FIG. 1, upon detecting a fault, AIS cells are typically generated at the detecting NE on each VP or VC within a group. Typically one AIS cell is sent each second. At a sink NE receiving the AIS cell, an AIS state is declared in response to receiving an AIS cell. The sink NE, in response, sends RDI cells upstream to the source NE. RDI cells have the same format as AIS cells, with the exception of a function type of 0001 contained in the OAM function type field. Upon receipt of an RDI cell, the source NE assumes an RDI state.

In 1+1 or 1:1 protection switching, the sink NE begins to use data received on the protection enuity, immediately upon receipt of an AIS cell. In 1:1 protection switching, the source NE only begins to send traffic on the protection entity upon receipt of an RDI cell. Upon receipt, the protection entity will be used to transport traffic between the source and sink NEs.

ITU-T Recommendation I.630 further defines the use of APS coordination protocol ("CP") cells to effect ATM protection switching. CP cells are identified by an OAM function type of 0101 (binary) contained in the OAM type field of such cells. Further the value of the function type field indicates whether a CP cell is relevant to a VPG or VCG (function type=0000), or to an individual channel (function type=0001). CP cells, unlike AIS cells, may be passed in-band within a VC without loss of traffic. Alternatively, CP cells may be passed within an APS channel associated with a VPG or VPC. As detailed in ITU-T Recommendation I.630, CP cells are preferably generated and transmitted periodically, at five second intervals. Values within CP cells indicate the current perceived state of an entity at an NE. Thus, CP cells may signify that an NE has detected a defect within a VP or VC, or alternatively that no defect has been detected. Unlike an AIS cell, a CP cell indicates to a downstream or upstream NE the current state of a entity as perceived by an NE. A CP cell need not indicate an alarm. Moreover, CP cells are not transmitted in place of traffic within a VP or VC, but instead are transmitted in addition to traffic within the VP or VC. In response to receiving a CP cell indicative of a defect condition, a downstream NE may begin receiving data on a protection entity. Similarly, for 1:1 or m:n protection switching, upon generating or receiving a CP cell indicative of a working entity defect, a source NE may transmit traffic on the protection entity.

As will be appreciated the state of each entity is maintained by an associated NE. A transition from one state to another may be effected by receipt of AIS cells (AIS state), or lack of receipt of AIS cells for a duration. Alternatively, a transition from one state to another may be effected by receipt of CP cells signifying a particular state.

ITU Recommendation I.630 further suggests use of F4 or F5 end-to-end or segment PM OAM flows to detect the degradation of working or protection entities. The format of PM OAM cells is further detailed in ITU-T Recommendation I.610. Specifically, a forward PM OAM cell is typically inserted at a source NE, periodically between user cells. PM OAM cells are extracted at the sink NE. PM OAM cells may be inserted into F4 flows, on individual channels or F5 flows, relative to entire VPs.

Figure 2:
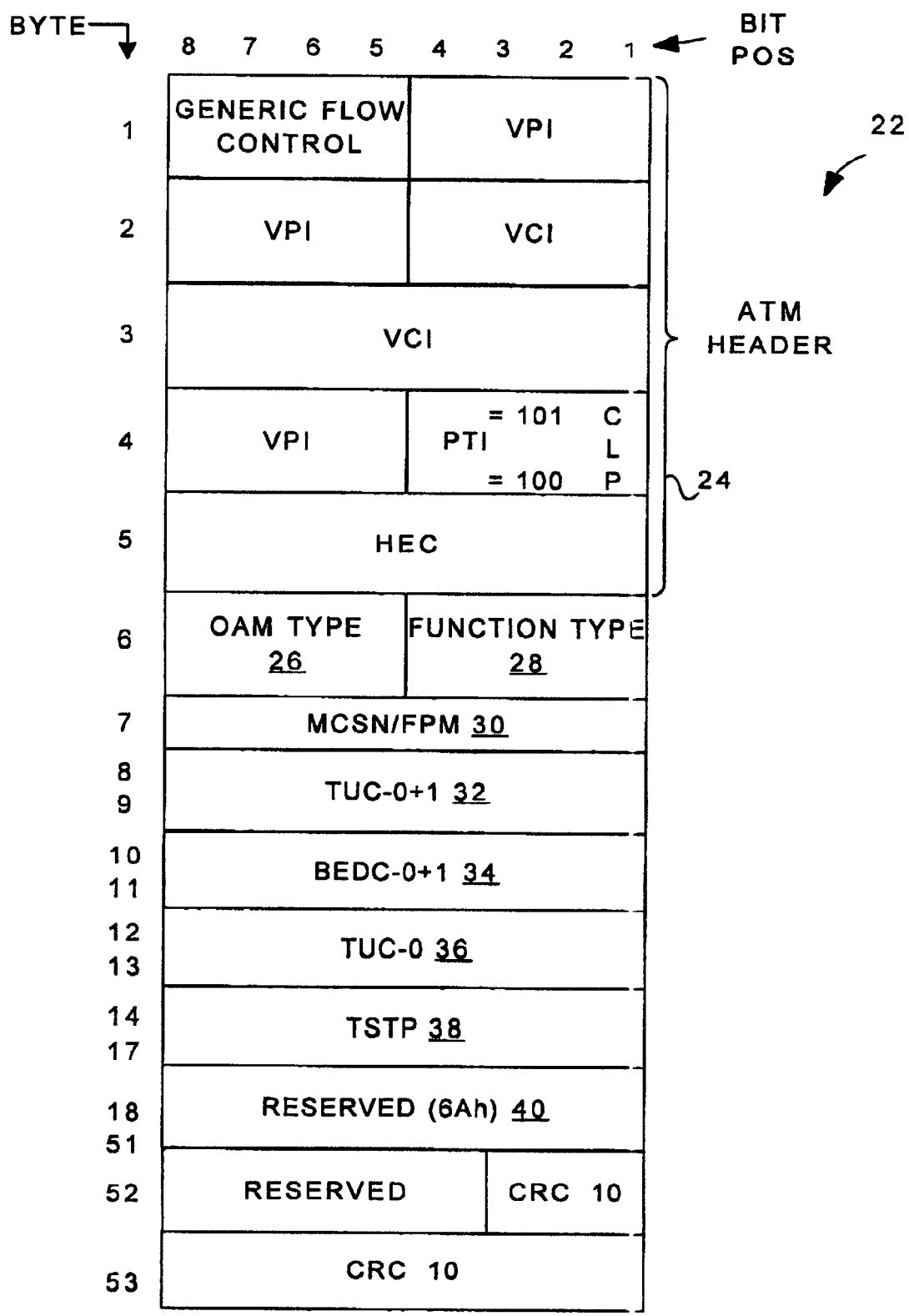
FIG. 2 illustrates the format of forward performance monitoring ("PM") operations and management ("OAM") cell passed between the NEs of FIG. 1.

The format of a typical forward PM cell, as suggested in ITU-T Recommendation I.610, is illustrated in FIG. 2. As illustrated, a typical PM OAM cell 22 includes a standard forty bit header 24; a four bit OAM type field 26 (having a value of 0010); a four bit function type field 28 (having a value of 0000); an eight bit monitoring cell sequence number ("MSN") in field 30; a two byte (sixteen bit) running counter of the number of user transmitted Cells ("TUC-0+1), since the last PM cell in field 26; a two byte (sixteen bit) bit interleaved parity ("BIP") code ("BEDC")calculated over the information fields of the previous uses cells in field 34; a two byte (sixteen bit) running counter of number of priority "0" user cells transmitted ("TUC-0") since the last PM cell in field 36; and an optional four byte (thirty-two bit) time stamp in field 38. The remaining thirty-four function specific bytes in field 40 within the PM OAM cell 22 are unused, and preferably contain the value of 6A (hex).

A sink NE may count the total number of cells it receives on a VP or VC, depending on whether F4 or F5 flows are used, and between PM cells. It may also calculate a BIP error detection code for the received cells, in a conventional manner in the same way as a BXP error detection code is calculated at a source NE for insertion into a PM OAM. Additionally, the NE may count the total number of priority "0" cells it receives. To determine if a signal degrade condition exists using PM OAM cells, the sink NE may compare the count of priority "0" cells in field 36 with the count maintained at the NE. If the two do not match, a SD state may be declared. If the two match, a further comparison of total number of cells received to the count in field 32 may be made. If these two do not match, the lost cells may be attributable to cells dropped by the ATM layer in order to ensure a certain quality of service for other transported cells. If the total number of cells received matches the value of field 32, the BIP error detection code contained within field 34 and the BIP error detection code calculated at the NE may be compared. If these are not equal a SD may be declared.

As will be appreciated, calculating a BIP at the NE injecting the OAM PM cells, and at a sink NE, as well as injecting OAM PM cells consumes network resources and does not allow for the fast detection of signal degrade conditions. Moreover, using this technique to monitor signal degrade conditions for entire VPs or entire logical groups of VCs or VPs would require monitoring of PM flows on all channels within the VPG or VCG.

In practice signal degrade as detected by the ATM layer is caused almost entirely by signal degrade in the physical layer. As such, all VPs or VCs following the same physical route should be similarly impacted. Monitoring individual ATM VCs following the same physical route, using PM OAM flows may thus be unnecessary. Similarly, in most configurations, monitoring all VCs within a VCG will be unnecessary, as most if not all of these will follow the same physical path, and will be switched together.

Accordingly, in a manner exemplary of the present invention, PM OAM flows are used on a small subset of VPs within a VPG or VCs within a VCG to detect SD. Preferably OAM PM flows are injected on a single VP within a VPG or a single VC within a VCG to detect SD within the VPG or VCG. In the event that SD is detected along the single VP or VC, a SD state is declared for the entire VPG or VCG, and traffic is switched to the protection entity.

Figure 3:
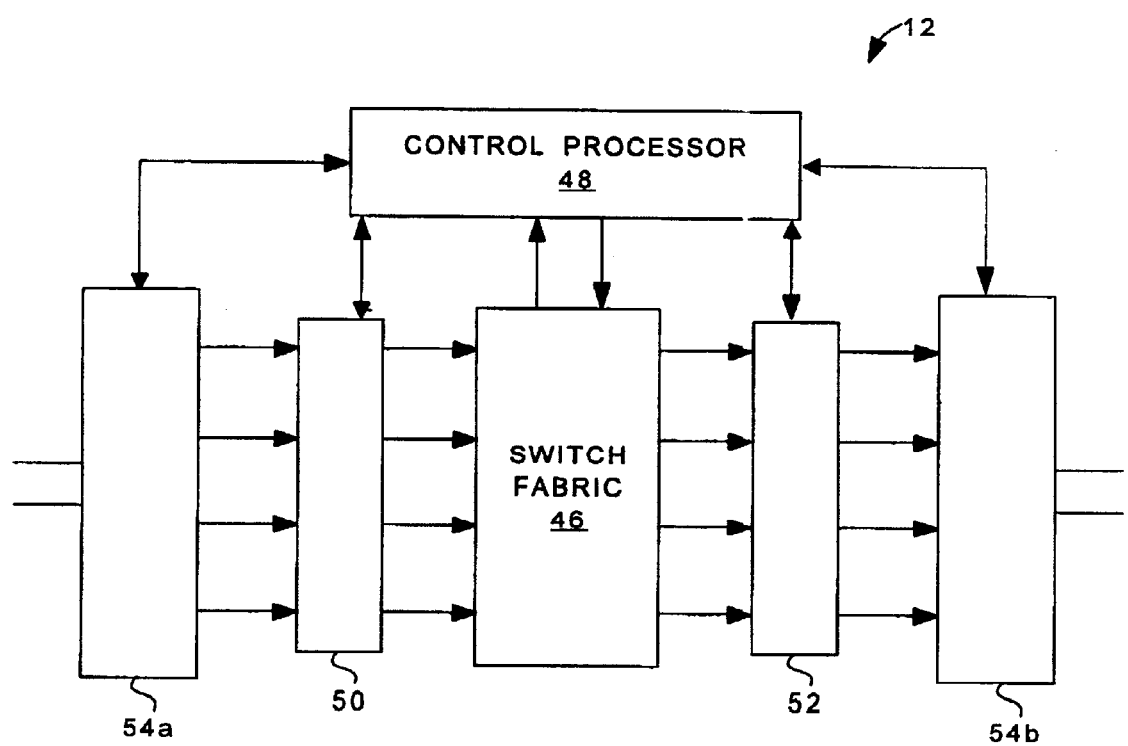
FIG. 3 is a simplified block diagram of an NE of FIG. 1.

An example architecture of any one of NEs 12 is therefore illustrated in FIG. 3. Practically, NE 12 may be formed as part of a conventional SONET add-drop multiplexer ("ADM"). As illustrated, NEs 12 each include an ATM switch fabric 46, functionally interconnected with an ATM processor 48; input port controllers 50, and output port controllers 52. Input port controllers 50 and output Port controllers 52 are further interconnected with physical layer interface 54, illustrated in two portions 54a and 54b.

As will be appreciated by those of ordinary skill in the art, switch fabric 46 includes input and output ports interconnected with port controllers 50 and 52. Switch fabric 46 routes incoming ATM cells received at the input ports to desired output ports. Switch fabric 46 may be formed as a time division switch; a fully interconnected mesh; a crossbar or matrix switch; a Banyan switch fabric; a Batcher-Banyan switch fabric; an augmented Banyan switch fabric; a BeNES switch fabric; a Clos switch fabric; a parallel switch fabric; or any other switch fabric known to those of ordinary skill in the art.

Input port controllers 50 receive streams of data from physical layer interface portion 54a and manage streams of input ATM cells. Controllers 50 may delineate cells; buffer incoming cells; align cells for switching; or identify output ports and establish a path across switch fabric 46 on the basis of information in the cell headers.

Output port controllers 52 similarly manage streams of output ATM cells from switch fabric 46. Output port controllers 52 may strip off self-routing labels; buffer ATM cells awaiting transmission; align cells; and transfer cells to physical layer interface portion 54b.

ATM processor 48 controls the overall operation of NE 12, and may include a processor and storage memory (not specifically illustrated) including program instructions and adapts NE 12 to operate in accordance with ATM protocols, and in manners exemplary of the present invention. As such, ATM processor 48 extracts and injects OAM cells including PM OAM cells from and to ATM streams. As will be appreciated, in order to achieve high speed operations, many of the control functions of ATM processor 48 may alternatively be formed in hardware.

As will become apparent, control processor 48 is adapted to generate ATM CP cells; AIS cells; and OAM PM cells as described below that are indicative of the signal degrade. These cells are further passed to a downstream or upstream NE.

Figure 4A:
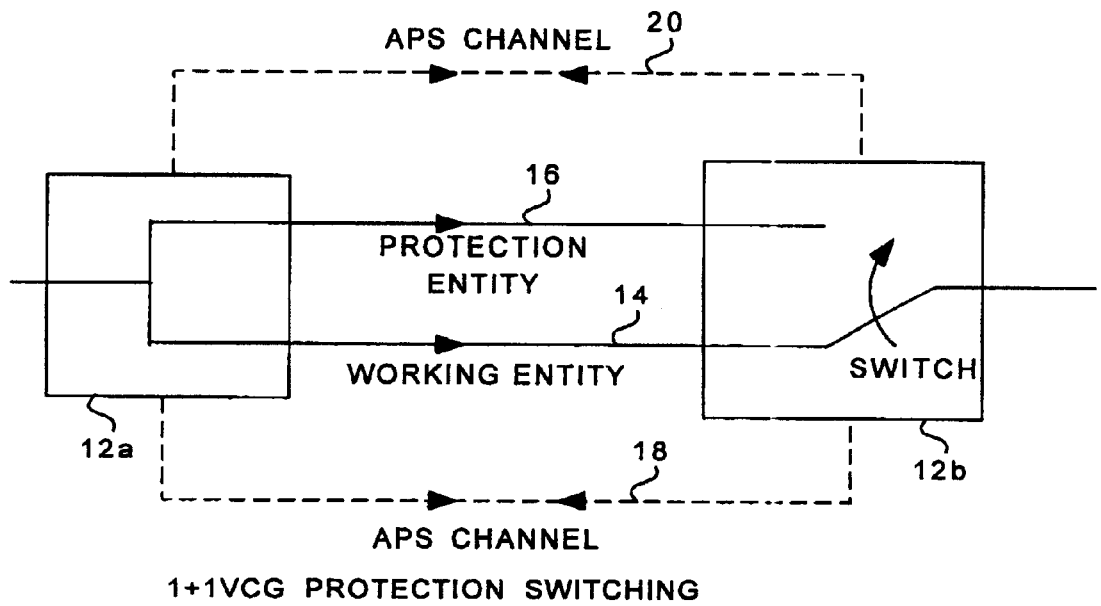
FIG. 4A is a simplified block diagram of two NEs configured for 1:1 virtual channel group ("VCG") protection switching.
Figure 4B:
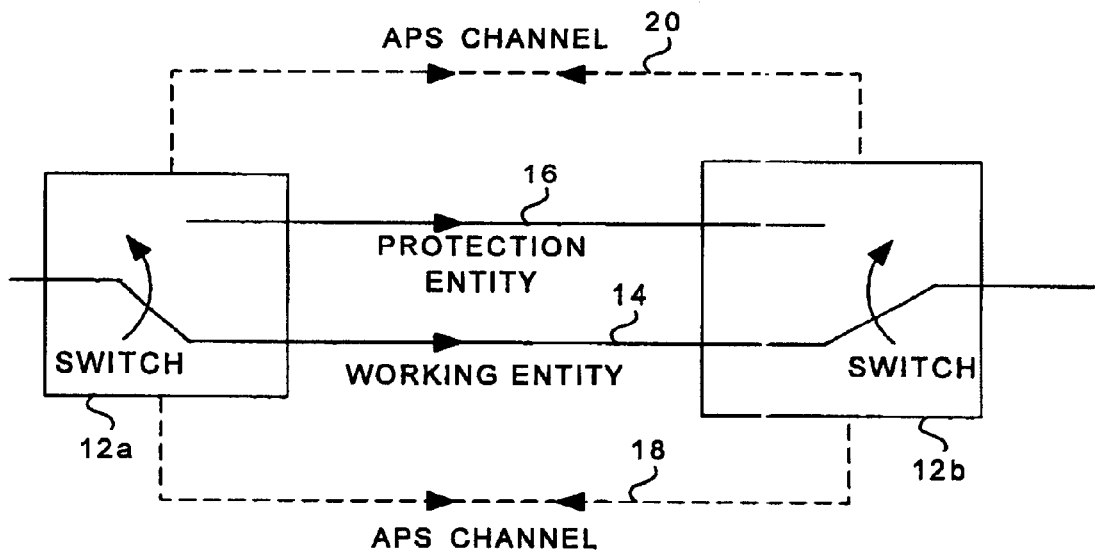
FIG. 4B is a simplified block diagram of two NEs configured for 1+1 VCG protection switching.

In operation, example NEs 12a and 12b are configured to provide protection switching of VCGs and thus provide protection switching, as illustrated in FIGS. 4A and 4B. For simplicity of illustration, FIGS. 4A and 4B only illustrates protection switching for traffic transported from NE 12a to NE 12b. FIG. 4A illustrates NEs 12a and 12b configured for 1+1 VCG protection switching. FIG. 4B illustrates NEs 12a and 12b configured for 1:1 VCG protection switching. The protected VCGs are configured at NEs 12a and 12b, and any intermediate NEs with each of the NEs maintaining configuration data identifying those VPI/VCI pairs contained within a VCG. An APS channel (or series of channels) on link 18 carries OAM cells relevant to a group protection switching for the VCG that is transported on entity 14. Again, entity 14 acts as a working entity, while entity 16 acts as a protection entity and is thus part of the protection group. An APS channel (or series of channels) on link 20 carries OAM cells relevant to the protection VCG transported on entity 16.

In normal operation, traffic is transported on entity 14. In 1:1 protection switching, entity 16 is provisioned but does not carry redundant traffic. Upon detection of a conventional fault, such as an LOC, LOD, LOS, on any VG or VP within a group, ATM processor 48 (FIG. 3) of NE 12a generates AIS cells on each VC within the VCG and injects these on the APS channel on link 18. These are passed to NE 12b. ATM processor 48 of NE 12b in turn Generates RDI cells, and passes them along the affected VCs and the APS channel to NE 12a. In 1:1 protection switching (FIG. 4A), NE 12a begins to transmit traffic on entity 16. NE 12b, also switches to receive traffic previously carried on entity 14 from entity 16, as illustrated. That is, upon receipt of traffic on entity 16, NE 12b switches to receive this traffic in place of traffic on entity 14. In 1+1 protection switching (FIG. 4B) NE 12 under control of ATM processor 48 switches to receive traffic on entity 14 immediately upon receipt of AIS cells, or upon detection of a fault.

At the same time, and in a manner exemplary of the present invention, ATM processor 48 of NE 12a periodically injects OAM PM cells into one VC within each defined VC group. The VC on which OAM PM cells are injected may be configured at NEs 12a and 12b. Practically, any VC within the VCG may be used to transport injected OAM PM cells. Specifically, as noted, forward PM OAM cells, having the format of PM cell 22 illustrated in FIG. 2 may be inserted at a source NE (such as NE 12a) and extracted at a sink NE (such as NE 12b) on a single VC within a VCG. Each PM cell may be sent after a block of user cells. Typically, a PM cell is transported after 1024 user cells. Of course, PM cells may be transported at other intervals as detailed in ITU Recommendation I.610.

An ATM processor 48 of a sink NE, such as NE 12b counts the number of user cells it receives and also calculates a BIP error detection code for the received user cells, in the same manner as this BIP is calculated by NE 12a. Moreover, it tracks the sequence number of each received OAM PM cell injected into the stream. To determine if a signal degrade condition exists, ATM processor 48 of NE 12b first compares the sequence number in field 30 of a received OAM PM cell. If incorrect (ie. the received sequence number does not equal the previously received sequence number, incremented by one) ATM processor 48 of NE 12b may declare an SD state for the VCG on entity 14 at NE 12b. If the sequence number is in order, ATM processor 48 of NE 12b compares the total count; priority "0" count; and BIP error detection code to the contents of the received PM cell, to assess SD as described above. If appropriate, ATM processor 48 of the sink NE 12b recognizes a SD on the entity 14.

In response to detecting a SD condition on a single VC within a VCG, the sink NE 12b, switches to receive traffic on protection entity 14. Specifically, if configured for 1+1 protection switching (FIG. 4a), NE 12b may receive traffic on entity 16 in favour of traffic on entity 14 for all VCs within the VCG immediately upon detecting a SD condition on a single channel. Specifically, ATM processor 48 may direct switch fabric 46 to receive traffic from entity 16. For 1:1 protection switching (FIG. 4B), ATM processor 48 of NE 12b may generate CP cells indicative of the signal degrade and forward these by way of switch fabric 46 to the upstream NE 12a on the APS channel carried by link 18. Assuming that the state of entity 16 is not failed, NE 12a may begin to transmit data carried or, entity 14 on the protection entity 16 for all channels within the VPG. NE 12b, upon receipt of traffic on entity 16 switches to receive traffic transported on entity 16 in favour of traffic on entity 14. NEs 12*a* and 12*b* continue to monitor the signal degrade state of entity 14 by periodically injecting OAM PM cells into a single channel within a VCG at NE 12*a*, and in response periodically, exchange CP cells indicative of this signal degrade state of entity 14 on the APS channel on link 18. NEs 12*a* and 12*b* similarly monitor the signal degrade state of entity 16 by injecting OAM PM cells on a single VC within the carried on entity 16.

In the event of signal degrade on th(e monitored VC channel on entity 16, CP cells may be generated on link 20. NEs 12*a* and 12*b* continue to transport traffic on entity 16 in favour of entity 14, until exchanged CP cells indicates a more severe condition of entity 16 than entity 14. That is, in the event entity 16 assumes a SF state, traffic may be switched back to entity 14 even in the event of a signal degrade condition on entity 14.

As will be appreciated, the above described embodiments may easily be modified for VPG protection switching. OAM cells are simply injected and monitored on subset of VPs within a VPG. In response to sensing signal degrade on the subset, traffic in the entire VPG is switched to a protection entity. As will further be appreciated, the particular format of PM cells, CP cells and AIS cells is somewhat arbitrary, and may be varied, as understood by one of ordinary skill in the art. For example, a CRC or similar error detection code could be used instead of a BIP error detection code in field 34.

As will also be appreciated, while the organization of hardware functional blocks, have been illustrated as clearly delineated, a person skilled in the art will appreciate that the delineation between blocks is somewhat arbitrary. Numerous other arrangements of hardware blocks are possible.

The above described embodiments, are intended to be illustrative only and in no way limiting. The described embodiments of carrying out the invention, are susceptible to many modifications of form, size, arrangement of parts, and details of operation. The invention, rather, is intended to encompass all such modification within its cope, as defined by the claims.

What is claimed is:

1. At a network element within an ATM network, a method of switching receipt of traffic from a group of working ATM channels to a group of protection ATM channels, said method comprising:
    a) receiving ATM monitoring cells on a subset of ATM channels of said group of working ATM channels, each of said ATM monitoring cells including an error detection code for a plurality of ATM cells received at said network element within an associated ATM channel;
    b) in response to said error detection codes within said ATM monitoring cells indicating a degraded signal within an associated ATM channel, switching said network element to receive said traffic from all ATM channels within said group of protection ATM channels in favour of receiving said traffic on said group of working ATM channels.

2. The method of claim 1, further comprising:
    c) generating ATM cells indicative of said signal degrade at said network element.

3. The method of claim 2, wherein said monitoring comprises calculating a bit-interleaved parity error detection code for said plurality of ATM cells received at said network element.

4. The method claim 1 further comprising comparing said bit-interleaved parity error to said error detecting code.

5. The method of claim 3, wherein said ATM cells indicative of said signal degrade are generated on an out-of-band signaling channel.

6. The method of claim 5, wherein said working ATM channels are part of an ATM virtual channel group ("VCG") maintained at said network element.

7. The method of claim 1, wherein an ATM monitoring cell is received on a single channel of said group of working ATM channels.

8. At a network element within an ATM network, a method of switching receipt of traffic from a group of working ATM paths to a group of protection ATM paths within said ATM network, said method comprising:
    a) receiving ATM monitoring cells on a subset of ATM paths of said group of working ATM paths, each said ATM monitoring cells including an error detection code for a plurality of ATM cells received at said network element within an associated ATM path;
    b) in response to said error detection codes within said ATM monitoring cells indicating a degraded signal within an associated ATM path, switching said network element to receive said traffic from all ATM paths within said group of protection ATM oaths in favour of receiving said traffic on said group of working ATM paths.

9. The method of claim 8, wherein said working ATM paths are part of an ATM virtual path group ("VPG"), maintained at said network element.

10. The method of claim 8, further comprising:
    c) generating ATM cells indicative of said signal degrade at said network element.

11. The method of claim 9, wherein said monitoring comprises calculating a bit-interleaved parity error detection code for said plurality of ATM cells received at said network element.

12. The method claim 10, further comprising comparing said bit-interleaved parity error to said error detecting codes.

13. The method of claim 10, wherein said ATM cells indicative of said signal degrade are generated on an out-of-band signaling channel.

14. The method of claim 8, wherein an ATM monitoring cell is received on a single ATM path of said group of working ATM paths.

15. A network element for use within an ATM network comprising:
    an ATM switch fabric,
    an ATM processor in communication with said ATM switch fabric,
        said ATM processor adapted to
            extract at least one ATM monitoring cell from a subset of ATM channels in a group of working ATM channels on said network, said ATM monitoring cell including an error detection code for a plurality of ATM cells received at said network element within an associated ATM channel;
            in response to said error detection code within said at least one ATM monitoring cell indicating a degraded signal within an associated ATM channel, direct said switch fabric to receive said traffic from all ATM channels within a group of protection ATM channels in favour of receiving said traffic on said group of working ATM channels.

16. The network element of claim 15, further comprising memory storing configuration data identifying said working ATM channels as an ATM virtual channel group ("VCG").

17. The network element of claim 15, wherein said ATM processor is further adapted to calculate a bit-interleaved parity error detection code for said received cells and compare said bit-interleaved parity error detection code to said error detection ode within said ATM monitoring cell.

18. A network element for use within an ATM network comprising:
  an ATM switch fabric,
  an ATM processor in communication with said ATM switch fabric,
    said ATM processor adapted to
      extract at least one ATM monitoring cell from a subset of ATM paths in a group of working ATM paths on said network, said ATM monitoring cell including an error detection code for a plurality of ATM cells received at said network element within an associated ATM path;
      in response to said error detection code within said at least one ATM monitoring cell indicating a degraded signal within an associated ATM path, direct said switch fabric to receive said traffic from all ATM channels within a group of protection ATM channels in favour of receiving said traffic on said group of working ATM channels.

19. Computer readable memory storing computer instructions adapting an ATM network element comprising an ATM switch fabric and an ATM processor in communication with said ATM switch fabric to
  extract at least one ATM monitoring cell from a subset of channels in a group of working ATM channels on an ATM network, said ATM monitoring cell including an error detection code for a plurality of ATM cells received at said network element within an associated ATM channel;
  in response to said error detection code within said at least one ATM monitoring cell indicating a degraded signal within an associated ATM channel, direct said switch fabric to receive said traffic from all channels within a group of protection-ATM channels in favour of receiving said traffic on said group of working ATM channels.

20. Computer readable memory storing computer instructions adapting an ATM network element comprising an ATM switch fabric and an ATM processor in communication with said ATM switch fabric to
  extract at least one ATM monitoring cell from a subset of ATM paths in a group of working ATM paths on an ATM network, said ATM monitoring cell including an error detection code for a plurality of ATM cells received at said network element within an associated ATM path;
  in response to said error detection code within said at least one ATM monitoring cell indicating a degraded signal within an associated ATM path, direct said switch fabric to receive said traffic from all ATM paths within a group) of protection ATM paths in favour of receiving said traffic on said group of working ATM paths.

* * * * *

UNITED STATES PATENT AND TRADEMARK OFFICE
CERTIFICATE OF CORRECTION

PATENT NO. : 6,654,923 B1  
DATED : November 25, 2003  
INVENTOR(S) : Grenier et al.

Page 1 of 1

It is certified that error appears in the above-identified patent and that said Letters Patent is hereby corrected as shown below:

Column 9,
Line 63, replace "the method claim 1" with -- the method of claim 3 --;

Column 12,
Line 8, replace "protection-ATM" with -- protection ATM --;
Line 26, replace "a group)" with -- a group --

Signed and Sealed this

Fourth Day of May, 2004

JON W. DUDAS  
*Acting Director of the United States Patent and Trademark Office*